(12) United States Patent
Actis-Datta (10) Patent No.: US 7,329,000 B2
(45) Date of Patent: Feb. 12, 2008

(54) CLIPPED LENS EYEGLASSES

(75) Inventor: Sebastien Actis-Datta, Villars-Tiercelin (CH)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 43 days.

(21) Appl. No.: 11/358,109

(22) Filed: Feb. 22, 2006

(65) Prior Publication Data

US 2006/0139566 A1    Jun. 29, 2006

Related U.S. Application Data

(63) Continuation-in-part of application No. PCT/FR2004/002121, filed on Aug. 11, 2004.

(30) Foreign Application Priority Data

Oct. 2, 2003    (FR) .................................. 03 11532

(51) Int. Cl.
    *G02C 1/00* (2006.01)
(52) U.S. Cl. ............................ 351/86; 351/61; 351/83; 351/103; 351/106
(58) Field of Classification Search .................. 351/85, 351/86, 106, 83, 103, 110, 154, 41, 158, 124, 351/126, 61
    See application file for complete search history.

(56) References Cited

U.S. PATENT DOCUMENTS

| 3,470,222 | A |   | 9/1969 | Eisler |
| 3,535,028 | A | * | 10/1970 | Faas ............................ 351/61 |
| 3,709,587 | A |   | 1/1973 | Wick |
| 5,347,323 | A |   | 9/1994 | Wilson |
| 6,023,372 | A |   | 2/2000 | Olson et al. |
| 6,059,409 | A |   | 5/2000 | Sheldon |
| 6,969,172 | B2 | * | 11/2005 | Actis-Datta .................. 351/86 |

FOREIGN PATENT DOCUMENTS

FR    965 781    9/1950

* cited by examiner

*Primary Examiner*—Hung X. Dang
(74) *Attorney, Agent, or Firm*—Young & Thompson (57) ABSTRACT

The clip-lens eyeglasses frame includes a face structure provided with elements for clipping to at least one lens and arranged to operate by resiliently clamping the lens in a direction that is generally axial relative to the lens.

31 Claims, 6 Drawing Sheets

CLIPPED LENS EYEGLASSES

TECHNICAL FIELD TO WHICH THE INVENTION RELATES

The present invention relates in general to ophthalmic eyeglasses and/or sunglasses, and it relates more specifically to a frame for clipped lenses enabling the lenses to be mounted or replaced quickly, and it also relates to a quick-mount lens suitable for co-operating with such a frame.

TECHNOLOGICAL BACKGROUND

It is known that a pair of eyeglasses comprises two lenses that may be ophthalmic correcting lenses and/or sunglass lenses that are fitted to a frame which is designed to be placed on the wearer's nose in such a manner as to position one lens appropriately in front of each eye. Usually, the lenses are fixed permanently to the frame in a mounting operation.

There exist several ways of mounting ophthalmic lenses. There are thus frames with rimmed lenses in which the frame typically comprises rims having the peripheral edges of the lenses fitted in edge-on after being cut out to the corresponding shape.

There are also mounts using pierced lenses with wire frames that do not have rims, with the lenses being secured thereto at certain points by bolting. Typically, each lens presents two laterally-opposite through holes, one for securing to the corresponding end of the bridge, and the other to the hinge of the arm or "temple" that is associated therewith. Fastening is then provided by bolts or the like passing through the lens via the holes made in this way. In order to prevent the lens from pivoting in unwanted manner about the fastening bolts, a notch opening out to the edge of the lens is generally provided in the vicinity of each hole, and a finger is engaged in the notch to prevent turning.

Although those traditional mounting techniques generally give satisfaction from the point of view of positioning lenses accurately in front of the eye, they nevertheless present the major drawback of requiring a relatively difficult special operation to be performed by qualified operatives using relatively expensive special tooling. Furthermore, mounting performed in that way is permanent and a lens can be replaced only by performing an operation that is just as complex and that lies outside the normal ability of a wearer of eyeglasses not specialized in the assembly thereof.

As a result, the cost of fitting and replacing lenses is relatively high. However, there exists a need for inexpensive eyeglasses that can be assembled quickly, and also for lenses and frames to be interchangeable. Such a need for quick assembly and/or disassembly is felt more particularly under the following circumstances:

providing equipment in poor countries where there is a shortage of qualified personnel and a desire to provide the population with eyeglasses at low cost;
  wearers of eyeglasses desirous of having several pairs available at low cost; and
  wearers of eyeglasses interested in modularity, with lenses and frames being interchangeable as a function of their activities, the seasons, fashion, rapid changes to their eyesight, etc.

U.S. Pat. No. 6,059,409 provides a first answer to this expectation. It describes a pair of eyeglasses having clipped (or clamped) lenses that can be interchanged quickly. In those eyeglasses, the lenses are clipped transversely: the frame possesses studs that are elastically flexible transversely, i.e. in the plane of the lens, and that are suitable for co-operating with notches formed in the edge face of the lens. The major drawback of that solution lies in the radial nature of the elastic clamping performed, since in order to hold the lens effectively it needs to be associated with the lens being surrounded in part by a rim, thus making the frame as a whole relatively bulky and unattractive in appearance.

U.S. Pat. No. 3,471,222 (Eisler) describes half-glasses in which the lenses are fitted to the frame by their bottom edges being received in corresponding grooves in partial rims of the frames, after going past an end hard point. However the clamping force exerted by the partial rims on the lenses is essentially radial and not axial as specified by claim 1 of the present application. Like the preceding solution, the frame proposed in that way is unattractive and/or restricted to half-glasses, insofar as it is ill-suited to mounting lenses of larger size.

U.S. Pat. No. 3,709,587 describes a pair of eyeglasses in which the lenses are clipped to the frame by means of protuberances formed at the peripheries of the lenses and engaged in clamped manner in corresponding sockets in the frame. Two embodiments are envisaged.

Figure 1:
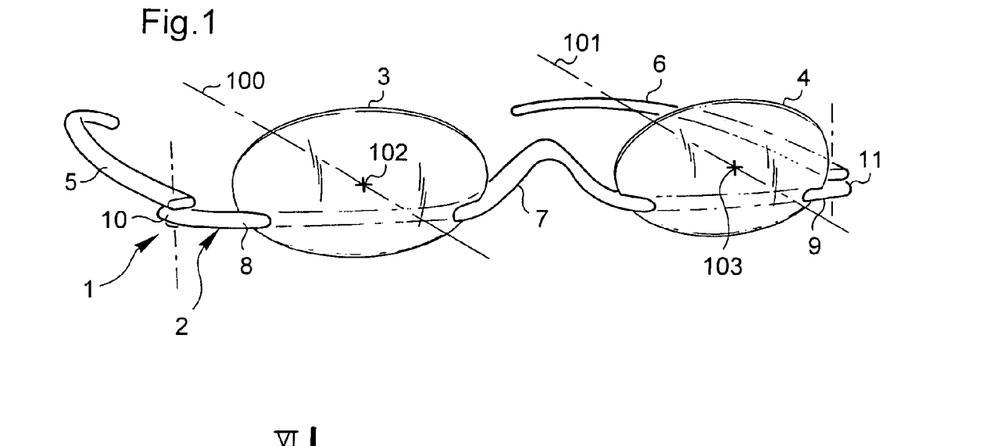
FIG. 1 is an overall perspective view of a pair of eyeglasses in a first embodiment of the invention.
Figures 2, 3:
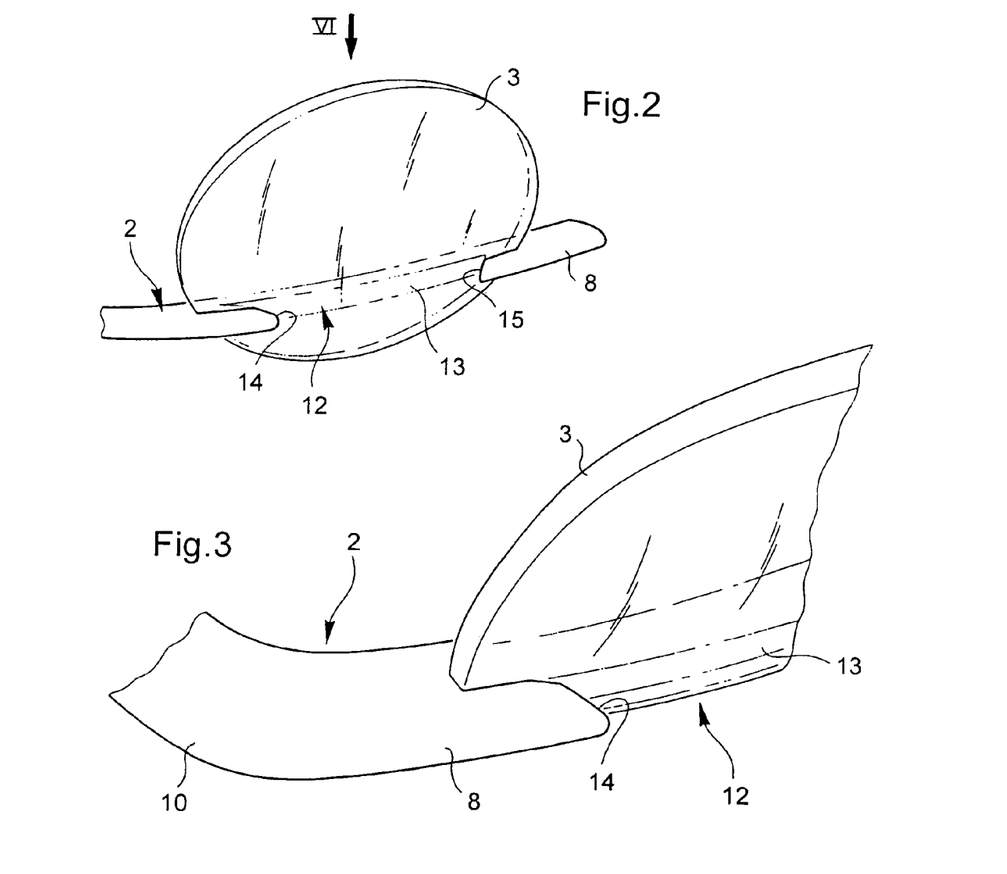
FIG. 2 is a detail view of FIG. 1, showing the fastening zone of a lens on a larger scale.
FIG. 3 is a detail view of FIG. 2 on an even larger scale.
Figure 4:
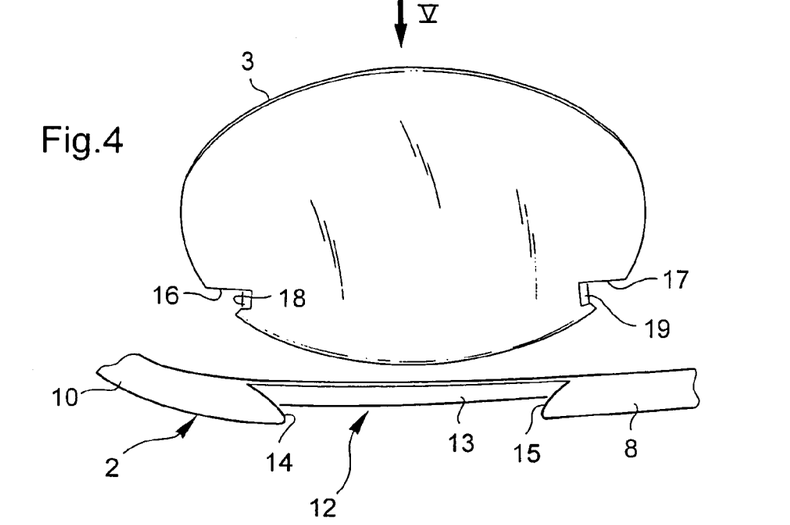
FIG. 4 is a front view seen from above as in FIG. 2, but showing the lens and the portion of the portion to which it is fastened in a disassembled configuration.

In the first embodiment, shown in FIG. 1 of that document, the frame possesses its own cohesion independently of the lenses, with small horizontal strips connecting the bridge to the temples. Each lens is fitted to the corresponding strip by means of a protuberance formed in the bottom portion of each lens in order to be fitted into a corresponding socket in the strip. Nothing is said about how the fitting is performed; in any event the fitting zone is unique for each lens, which makes mounting awkward to perform and not very reliable, in particular because of a lack of stability and rigidity.

Figures 12, 13:
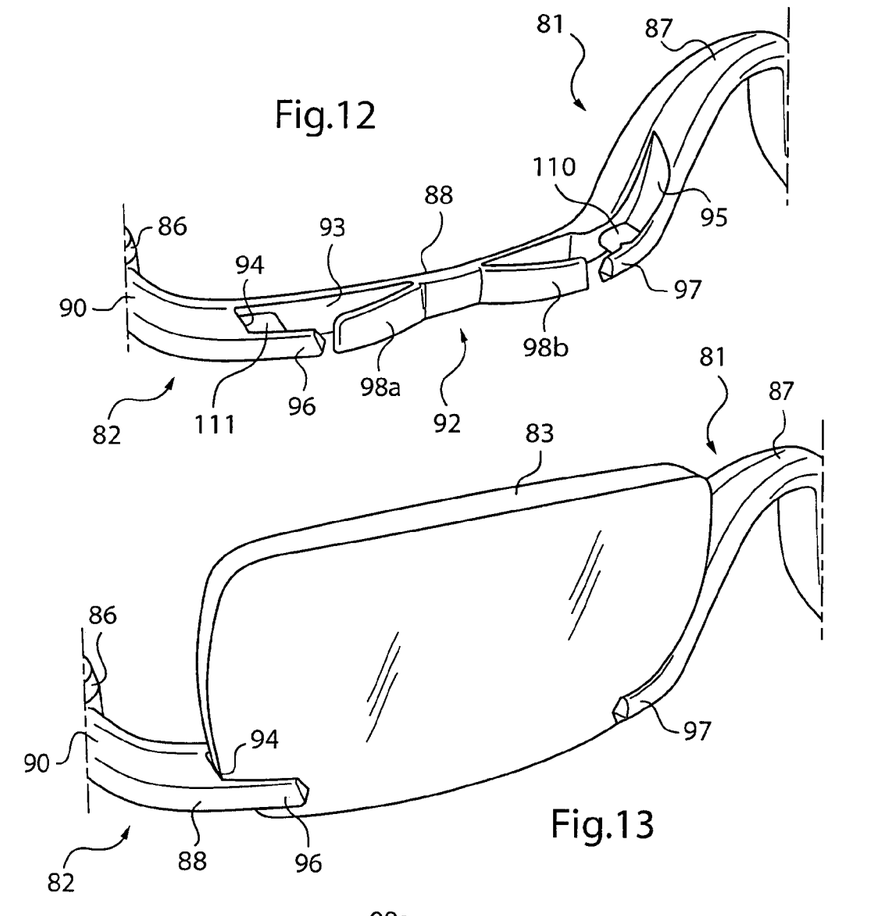
FIGS. 12 and 13 are fragmentary perspective views of a frame in a fourth embodiment of the invention showing the lens fastener zone respectively without and with the lens.

In the second embodiment shown in FIG. 12 of that patent, each lens is provided with two diametrically-opposite side studs that are engaged in corresponding notches of the frame. However the frame is made up of three separate portions: a bridge for the nose and two temples, without any rim or strip providing a connection between the bridge and the temple. Overall cohesion is provided by the lenses, which themselves provide the junction between the bridge and the temple. That structure for eyeglasses is lacking in rigidity, in particular when the lens and the frame constituted solely by the temples and the bridge are all made of plastics material. In addition the assembly is difficult to put together and can require the use of adhesive, which is unattractive in appearance and inconvenient.

OBJECT OF THE INVENTION

The object of the present invention is to provide an elegant solution to mounting lenses for eyeglasses quickly, providing both effective fastening of the lens to the frame, and a structure that is compact, enabling a frame to be of a refined shape.

To this end, the invention provides an eyeglasses frame with clipped lenses, the frame comprising a face structure provided with means for clipping to at least one lens, in which frame the means for clipping to at least one lens are arranged to operate by elastically clamping the lens, said clamping being exerted in a direction that is generally axial relative to the lens and in localized bearing zones, at least two of which are situated close to the edge of the lens and are angularly spaced apart from each other by at least 90° relative to the geometrical center of the edge of the lens. By means of the axial clamping performed in this way, it is possible to avoid any rim or other complex fitting or bolting system that is awkward to use without specialist tooling.

In an advantageous embodiment, the central bearing zone or stud is formed by an elastically flexible blade. This embodiment makes it possible to stiffen the horizontal strips of the frame by reserving the resilient return function to the wings formed by the blade. The wings are also capable of pressing against the rear face of the lens, fitting closely to part of its shape, thereby improving the effectiveness of the axial elastic clamping, and as a result improving the stability of the lens without damaging its surface state.

In which case, the frame advantageously has two central studs formed by two elastically flexible curved blades arranged to form two bird-like wings whose ends provide resilient bearing points for the lens to be fastened.

According to another characteristic, the means for clipping at least one lens are arranged to apply bidirectional resilient clamping on the lens in directions that are both transverse (i.e. orthoaxial) and axial relative to the lens. This ensures that the lens is fully retained, and in particular that radial slack is taken up. For example, provision can be made for the means for clipping at least one lens to possesses at least one oblique contact surface for acting like a ramp surface to provide the bidirectional nature of the clamping on the lens.

Also advantageously, the means for clipping at least one lens include, in addition to the axial clamping and the optional radial clamping, means for retaining the lens in an orthoradial direction. This prevents any unwanted sliding of the lens relative to the frame and in particular retains the lens in a predetermined angular position, preventing any turning thereof. The positioning of the lens is thus caused to be more precise, which is particularly advantageous when the lenses perform some complex optical function, such as lenses that are personalized and/or that present progressive variation of power.

Under such circumstances, in order to facilitate adapting lenses of different thicknesses to the frame and in order to make them easier to mount, it is advantageous to provide for the orthoradial retention means to constitute an axial slideway for the lens.

In a first embodiment, the means for clipping at least one lens comprise at least one elastic clamp having at least three studs, each forming a single-acting abutment and all arranged in a common horizontal plane in order to apply axial resilient clamping on the lens that is distributed over at least three aligned bearing zones, with two lateral studs arranged to bear against the lens in the vicinity of its edge, on one side thereof, and a central stud situated between the two lateral studs and arranged to bear against the lens on the other side thereof.

In a second embodiment, the means for clipping at least one lens comprise at least two resilient clamps arranged to apply two axial resilient clamping actions on the lens that are localized in two clamping zones situated close to the edge of the lens.

In a preferred embodiment, the face structure possesses a central bridge for the nose and on either side of said bridge and interconnected thereby, two horizontal strips that are generally in alignment with each other, at least one of which is provided with said means for clipping to at least one lens. This structure is particularly advantageous in that it provides new options in designing frames of refined shape that are particularly advantageous both in terms of optical performance and in terms of appearance, and in particular presenting a visual field with a top portion or a bottom portion (depending on the position of the strips) that is completely unobstructed.

Under such circumstances, the face structure with its two strips, its bridge for the nose, and its means for clipping to at least one lens, is advantageously made as a single piece in the form of a continuous horizontal bar presenting a vertical central fold forming the bridge for the nose.

The invention also provides eyeglasses comprising a frame including one or more of the characteristics set out above.

Advantageously, the eyeglasses include at least one lens presenting orthoradial retention means with which the orthoradial retention means of the means for clipping at least one lens of the frame engaged by having co-operating shapes. When the frame is provided with a slideway, the orthoradial retention means of the lens co-operate slidingly with the slideway of the frame.

When the clipping means of the frame are provided with an oblique ramp surface, the orthoradial retention means of the lens also possess a corresponding chamfered surface. This surface co-operates via an oblique ramp with the oblique contact surfaces of the means of the frame for clipping to at least one lens. By having plane-on-plane contact, this also improves the stability of the frame which comprises no more than two clamping zones.

Eyeglasses designed in this way can be of the display type, the frame then being provided with an active display device visible through the clipped lens. The ability to mount suitable correcting lenses quickly and on demand by the clipped fastening proposed by the invention then makes it easy to adapt display type eyeglasses to the eyesight of the wearer, and in particular to correct for ametropia and presbyopia so as to enable the wearer to see the image displayed by the active display device clearly and sharply.

Under such circumstances, it can be advantageous to provide for at least a portion of the display device to be received in at least one of the strips of the frame.

BRIEF DESCRIPTION OF THE DRAWINGS

Other characteristics and advantages of the invention appear on reading the following description of a particular embodiment, given by way of non-limiting example.

Reference is made to the accompanying drawings, in which.

MORE DETAILED DESCRIPTION

The eyeglasses shown in FIG. 1 comprise a frame 1 having two lenses 3, 4 fitted thereto.

The frame 1 comprises firstly a face structure 2 receiving the two lenses 3, 4 and secondly two temples 5, 6 hinged to the side ends of the face structure 2. On being worn, the two temples 5, 6 are conventionally designed to hook onto the ears of the wearer, or merely to bear against them.

Figure 5:
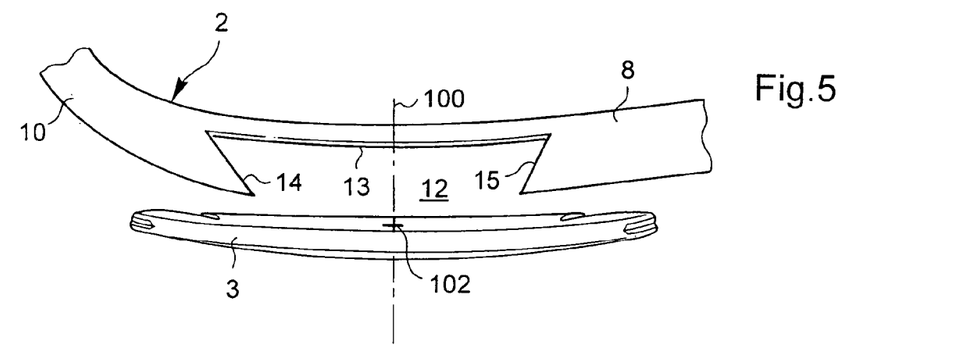
FIG. 5 is a plan view seen looking along arrow V of FIG. 4.

As a preliminary point, and referring to the shape of the lenses 3, 4, the following definitions are used in the context of the present specification. In FIGS. 1 and 5, the geometrical centers of the peripheral edges of the lens 3 and 4 are referenced 102 and 103. We consider a plane P (not shown) defined as being either the plane containing said peripheral edge, if the edge is plane, or else the midplane of the peripheral edge. This plane P which is substantially vertical while the eyeglasses are being worn, is referred to in the context of the present application the median plane of the lens or more simply the plane of the lens. An axis 100, 101 is then defined for each of the lenses 3, 4 as being the axis perpendicular to the plane P and passing through the corresponding center 102, 103.

In the description below, and in order to facilitate reading it together with the figures, reference is made to the concept of horizontally and verticality. These references should be understood as being approximate. Horizontal and vertical apply to a wearing configuration in which the frame is installed on the nose and the ears of the wearer, with the two lenses 3, 4 being situated generally in a vertical plane, while the axis 100, 101 of the lenses and the longitudinal directions of the temples 5, 6 are generally situated in horizontal planes.

As can be seen in FIG. 1, the face structure 2 possesses in its central zone a bridge 7 for engaging the nose that is generally in the form of an upside-down V-shape for bearing on the wearer's nose, and symmetrically on either side of the bridge 7 and interconnected thereby, two horizontal strips 8, 9 which are generally in alignment with each other.

In order to make the hinging of the temples 5, 6 easier to implement mechanically and in order to provide the frame with a certain amount of thickness for protecting the temples and the lenses, in particular when the temples 5, 6 are folded against the structure 2, the strips 8, 9 of the face structure 2 possess horizontally-bent outer side ends 10, 11 referred to as tenons, with the two temples 5, 6 for engaging the ears being pivotally mounted thereto about respective vertical axes.

In the two embodiments shown in FIGS. 1 to 8, the face structure 2 is in the form of a continuous horizontal bar presenting a vertical central fold forming the bridge 7 for the nose and, on either side of the central fold, two symmetrical strips 8, 9 that are in horizontal alignment with each other and that are extended outwards by the two tenons 10, 11. The strips 8, 9 present a uniform section that is substantially oval.

Since the two lenses 3, 4 are disposed on either side of the bridge 7, each of the two strips 8, 9 is provided with means for fastening the lens that is associated therewith.

In accordance with an essential characteristic of the invention, in order to ensure that the fastening of each lens 3 and 4 is convenient and fast, the fastening is of the clip type. That is why, in the context of the present specification, the term "means for clipping" is used to designate these quick fastener means for the lenses. The term "to clip" is used to mean fastening by temporary resilient clamping, using a clip or any other kind of resilient clamp.

A first embodiment of these means is shown in FIGS. 1 to 5. In order to receive the lens 3, 4 that is associated therewith, each of the two horizontal strips 8, 9 of the structure 2 presents a front lens-receiver notch 12. Along this receiver notch 12, each of the strips 8, 9 is curved longitudinally to match the curvature of the lens. The means for clipping the lens are arranged at the two side ends of the receiver notch.

The receiver notch 12 possesses two side ends 14, 15 arranged in undercut manner so that by virtue of their shape and their material, and in co-operation with the substantially rigid bottom 13 of the receiver notch 12, they constitute two resilient clamps that are V-shaped. Specifically, these two clamps constitute the means for clipping the corresponding lens 3, 4, and for this purpose they are arranged to apply axial resilient clamping thrust on the lens that is localized in two clamping zones situated in the vicinity of the edge of the corresponding lens 3, 4.

Because of their V-shapes, the two clamps as made in this way adapt to the axial and radial dimensions of the lenses 3, 4 by opening to a greater or smaller extent. This V-shape, and more precisely the oblique shape of the undercut ends 13, 14 of the receiver notch 12 relative to the axis of the lens in question, also enables the clamp 13, 14, 15, on closing resiliently and by virtue of its oblique ramp, to exert clamping having two components: an axial component and a transverse component, as explained in greater detail in the paragraph below. In addition, this embodiment is particularly advantageously because of its ease of manufacture and because of the refined design that it makes possible, while nevertheless performing all three of the above-mentioned functions.

It can be seen that the means as constituted in this way for clipping each lens 3, 4 are arranged to apply resilient clamping thrust to the lens in a direction that is generally axial relative to the lens, i.e. in its thickness direction. In addition, these means for clipping the lenses 3, 4 possess oblique contact surfaces that act like ramp surfaces to provide bidirectional resilient clamping on each lens, both in the axial direction and in the transverse direction of the lens. This ensures that each lens is fully retained, and in particular that any slack relative to the lens in its own plane is taken up. It will be understood that the transverse clamping operates in addition to the axial clamping in a direction that is substantially perpendicular to the axis 100, 101 of the corresponding lens 3, 4, i.e. in a direction that lies substantially in the plane of the lens 3, 4. In the example shown, the transverse clamping acts horizontally across the width of each lens 3, 4.

It can also be seen that the means for clipping the lenses are constituted exclusively, for the purpose of fastening a lens, by two resilient clamps that provide localized clamping of the type described above, that are arranged in a common horizontal plane on the strips 8, 9. In order to ensure that the fastening is robust and reliable, it is preferable to ensure that the clamps are not too close together. On the contrary, it is preferable for them to be angularly spaced apart from each other over not less than 90° about the axis 100, 101 or the geometrical center 102, 103 of the edge of the corresponding lens 3, 4. Conversely, it is also appropriate to avoid a configuration that comes close to being spaced apart at 180°. The angular spacing between the two clamps should preferably be less than 160°, with the axis of the lenses being located above the horizontal strips 8, 9. The field of vision provided by each lens is thus affected by the corresponding horizontal strip in its lower portion only. Specifically, this angular spacing is shown as being about 145°, and a good compromise between robust fastening and disengaging the top field of vision lies in the range 130° to 160°. This compromise also makes it possible to disengage a bottom portion of each lens that is situated below the horizontal strips 8, 9.

The width of the clamp 13, 14, 15 which in this example depends directly on the width of the corresponding strip 8, 9 is about 5 millimeters (mm). In general, it is preferable to provide for the clamping zones to extend over a width of at least 4 mm.

The means for clipping the lenses 3, 4 also include orthoradial retention means for each lens. In the example shown in FIGS. 1 to 5, these retention means are constituted by the strips 8, 9 themselves, and more precisely by the portions of the strips that are adjacent to the ends 14, 15 of the receiver notch 12, as can be better understood from reading the text below.

Each lens 3, 4 possesses its own orthoradial retention means that engage by co-operation of shapes with the orthoradial retention means of the frame 2. Specifically, the orthoradial retention means of each lens are implemented in the form of two analogous notches 16, 17 that are on opposite sides of the lens on a common horizontal plane. On assembly, these notches engage with corresponding portions of the strips 8, 9 that present practically the same vertical width, so as to obtain retention with little or practically zero slack.

These retention means serve to complement the quick fastening by axial and radial clamping to prevent any unwanted sliding of the lens relative to the frame. In particular, these means prevent the lens from turning about its axis away from a predetermined angular position. The positioning of the lens is thus more precise, which is particularly advantageous when the lens is to provide any complex optical function, such as personalized lenses and/or lenses with progressive power variation.

In the example shown, the notches 16, 17 in the lenses 3, 4 possess chamfered bottoms 18, 19 that co-operate after assembly with the oblique ends 14, 15 of the receiver notch 12 so as to act like an oblique ramp and contribute to provide clamping in two directions, with slack being taken up axially and transversely. By having plane-on-plane contact, the assembly that takes place via two clamping zones only is also made to be more stable.

Because of the refined structure of the design, and as shown, it is possible to provide for the face structure 2 with its two strips and its bridge for the nose, its angled ends, and its means for clipping to the lenses, as a single one-piece unit in the form of a continuous horizontal bar presenting a vertical central fold forming the bridge 7 for the nose. Specifically, this structural bar 2 is made as a one-piece molding of plastics material. Care should be taken to select a material that provides the frame with sufficient overall stiffness to ensure that it does not deform in unwanted manner in use, while it is being worn, and in particular to avoid curving the bar 2, while nevertheless presenting a certain capacity for elastic deformation so as to enable the lenses to be clipped into the notches. For example, it is possible to use (crystalline or amorphous) polyamide, propionate, acetobutyrate, cellulose acetate, polycarbonate, or polyester-polycarbonate copolymer.

Alternatively, it is also possible, for example, to provide a face structure 2 made of metal being formed from a plastically deformable metal wire that is curved so as to form the bridge for the nose and the bent ends.

Figure 6:
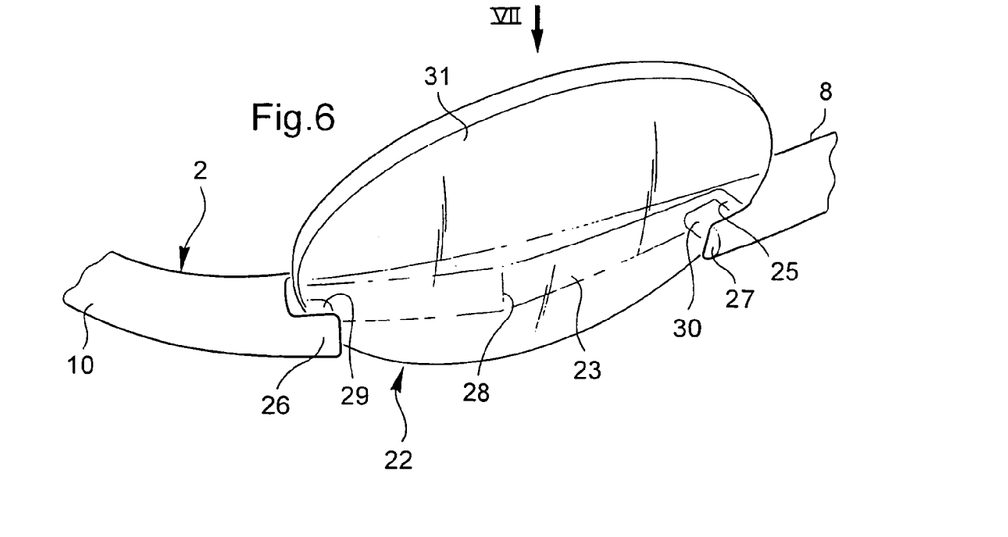
FIG. 6 is a detail view in perspective analogous to FIG. 2 showing a second embodiment of the invention.
Figure 7:
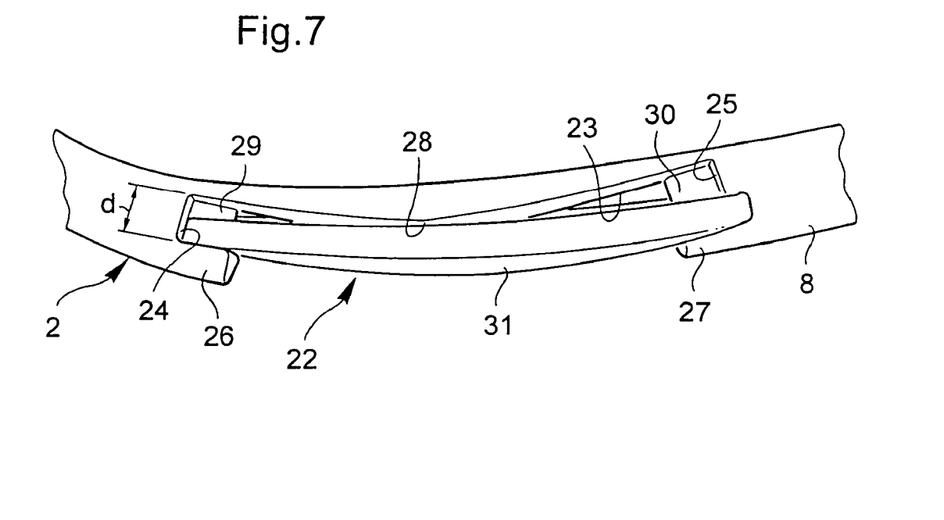
FIG. 7 is a plan view looking along arrow VII of FIG. 6.
Figure 8:
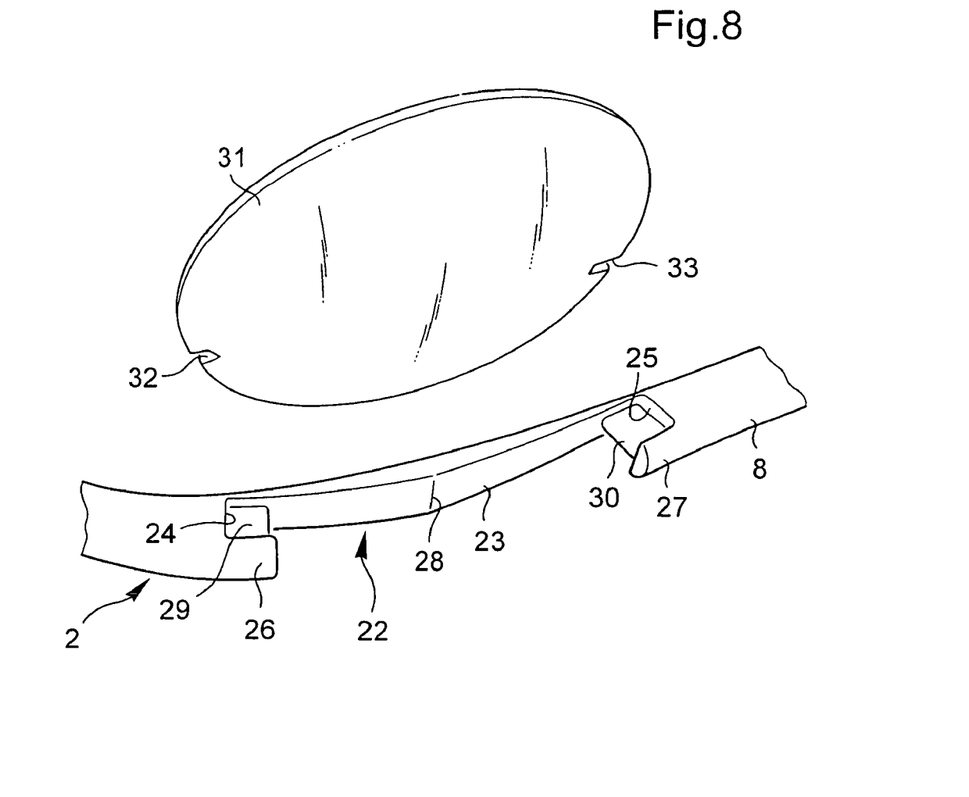
FIG. 8 is a perspective view like FIG. 6, showing the lens and the portion of the structure to which it is fastened, but in a disassembled configuration.

FIGS. 6 to 8 show a second embodiment of eyeglasses in accordance with the invention.

The general architecture of the frame is similar to that of the frame 1 described above with reference to FIG. 1. As before, the two lenses are placed on either side of the bridge 7, and each of the two strips 8, 9 is provided with means for fastening the associated lens. In accordance with an essential characteristic of the invention, in order to ensure that the fastening of each lens is convenient and fast, the fastening is of the clipped type. In FIGS. 6 to 8 only the right strip 8 is shown together with an associated lens 31. The remainder of the general structure of the frame is analogous to that shown in FIG. 1, having two temples 5, 6 and a central bridge 7 for the nose interconnecting the two strips 8, 9. Only the means for clipping the lenses to the strips 8, 9 differ from those in the above-described first embodiment.

As before, these clipping means relate to the strips of the structure. Only the means for clipping the right-hand strip 8 are shown; but it will be understood that the left-hand strip 9 (not shown) is provided with means that are symmetrical thereto.

In order to receive the lens 31 that is associated therewith, the horizontal strip 8 of the structure 2 presents a front lens-receiver notch 22. Along its receiver notch, each of the strips 8, 9 is curved longitudinally so as to match the curvature of the lens.

The means for clipping the lens are arranged firstly on the bottom 23 and secondly at the two side ends 24, 25 of the receiver notch.

Two holding pieces or fingers 26, 27 are formed at the side ends 24, 25 of the notch 22. These fingers project inwards from the side ends 24, 25 parallel to the longitudinal direction of the strip 8 in the corresponding zone, and they are arranged to bear against the convex face of the lens 31 in the vicinity of its periphery.

The receiver notch 22 possesses a bottom 23 that presents a surface that is convex, with a central vertical ridge 28 arranged to bear against the concave face of the lens 31 at a distance from its peripheral edge. In a variant, the central ridge 28 could be replaced by a spherical or toroidal bearing face that is continuous to the second order.

The side fingers 26, 27 and the central ridge 28 of the receiver notch 22 are horizontally aligned, and by virtue of their arrangement and the elasticity of the material constituting the strip 8, they constitute three branches or studs of a resilient clamp. Each of these three studs 26, 27, 28 forms a single acting abutment, and they are arranged to apply axial resilient clamping to the lens that is distributed over at least three bearing zones in alignment. The term "alignment" is used to mean that the three corresponding bearing zones are arranged in a common plane, which plane in this example is horizontal.

On assembly, the portion of the strip 8 in which the receiver notch 22 is formed, is itself deformed elastically so as to reduce its curvature, and the lens 31 is received in the notch 22 and is held therein under the elastic shape memory effect of the strip. It will be understood that this elastic shape memory of the strip causes axial elastic clamping to be applied as a result of the lens being sandwiched between firstly the side fingers 26, 27 and secondly the central ridge 28 on the bottom 23 of the receiver notch.

The two lateral studs are angularly spaced apart from each other by at least 90° relative to the geometrical center of the edge of the clipped lens.

The means for clipping the lenses are constituted exclusively, for the purpose of fastening a lens, by the resilient clamp having three studs in alignment of the type described above. For the same reasons as mentioned above with respect to the first embodiment, it is preferable to provide for the side studs of the clamp, i.e. the fingers 26, 27, to be angularly spaced apart from each other by at least 90° and at most by 160° relative to the axis or the geometrical center of the peripheral edge of the lens. Specifically, this angular spacing is about 145°, and a good compromise is obtained between robust fastening and an unobstructed top field of vision when the angle lies in the range 130° to 160°.

The means for clipping the lens 31 further comprise orthoradial retention means for each lens. In the example shown in FIGS. 6 to 8, these retention means are constituted by axial tongues 29, 30 of the strip 8 lying in a horizontal plane at the side ends of the receiver notch 22 between its bottom 23 and the fingers 26, 27.

The lens 31 itself possesses its own orthoradial retention means which engage by co-operation of shapes with the above-described orthoradial retention means of the frame 2, i.e. the tongues 29, 30.

These orthoradial retention means of the lens are constituted in this example by two analogous notches 32, 33 that are on opposite sides of the lens in a common horizontal plane. On assembly, these notches engage with the corresponding tongues 29, 30 of the strip 8 and they present practically the same vertical width as the corresponding tongues so as to obtain retention with very little or practically zero slack.

These retention means complete the quick fastening implemented by axial clamping so as to prevent any possible unwanted sliding of the lens relative to the frame. In particular, these means prevent the lens from turning about its own axis away from a predetermined angular position. The positioning of the lens is thus more accurate, which is particularly advantageous when the lenses perform a complex optical function, such as lenses that are personalized, and/or lenses presenting progressive power variation.

In addition, in this second embodiment, and as can be seen more clearly in FIG. 7, provision is made for the orthoradial retention means to constitute an axial slideway for the lens. This structural configuration whereby the orthoradial retention means of the lens co-operate slidably with the slideway of the frame serves to improve the ability of the frame to adapt to lenses of different thicknesses and thus make it easier to mount different thicknesses of lenses while still holding the lens stationary. Space is therefore preferably provided between each of the fingers 26, 27 and the bottom 23 for accommodation purposes, which space is referenced d in FIG. 7 and occupies at least 4 mm, thus providing the means for clipping the lens with axial clearance that is taken up by the resilience of the strip 8.

Figure 9:
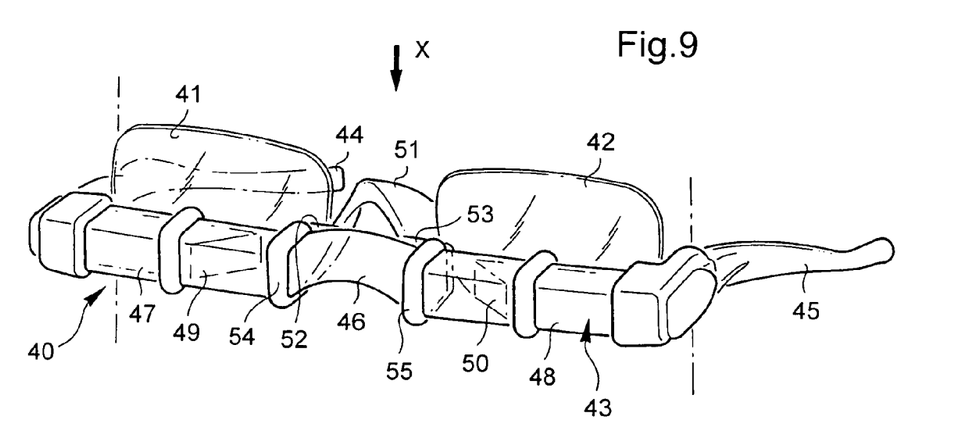
FIG. 9 is a perspective view of a pair of display eyeglasses in a third embodiment of the invention, in which the lenses are fastened in a manner analogous to the second embodiment of FIGS. 6 to 8.
Figure 10:
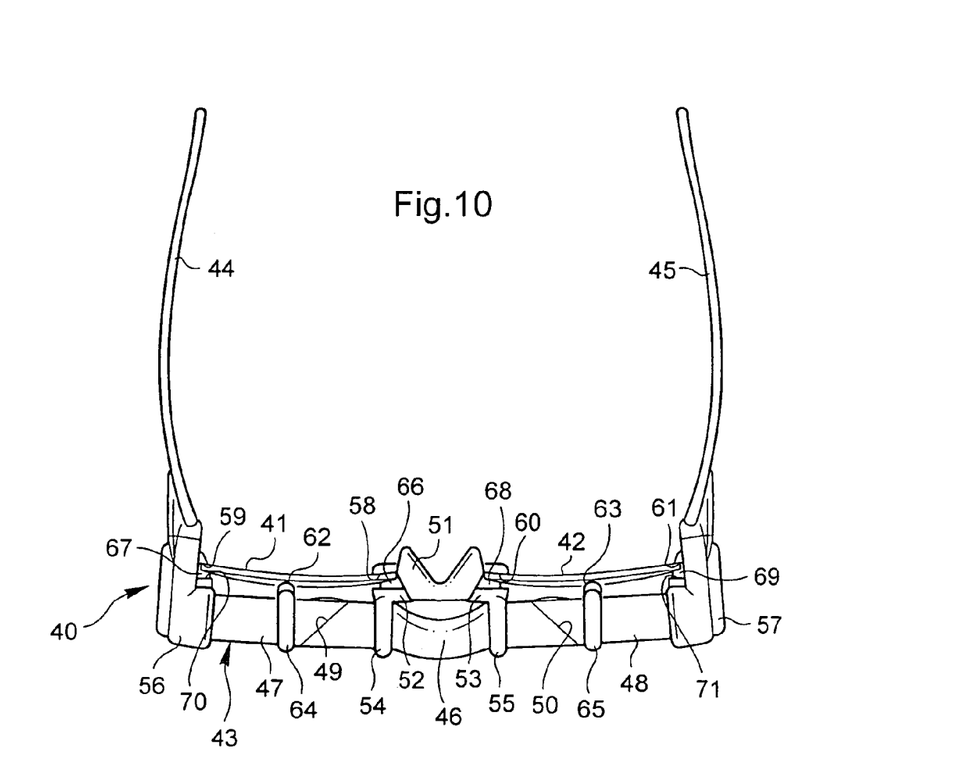
FIG. 10 is a plan view looking along arrow X of FIG. 9.
Figure 11:
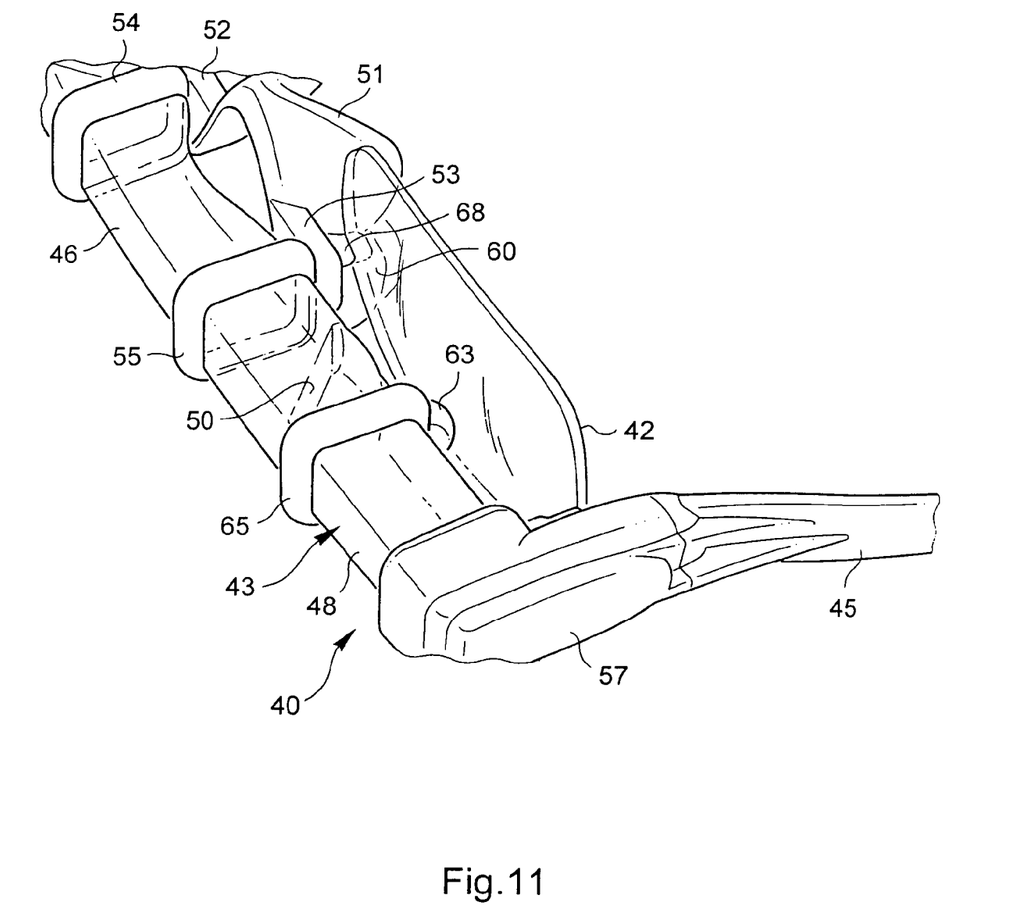
FIG. 11 is a detail view of FIG. 9, showing the clipped quick fastener means of the lens seen from a different angle.

FIGS. 9 to 11 show display lenses made in accordance with the invention. These lenses are referred to as display lenses because they are suitable for displaying a dynamic image in front of the eyes of the wearer, said image being generated by an electronic display device incorporated in the frame.

The displayed eyeglasses proposed in this way comprise a frame 40 on which two lenses 41 and 42 are fitted.

The frame 40 comprises firstly a face structure 43 receiving the two lenses 41, 42 and secondly two branches 44, 45 that are hinged to the side ends of the face structure 43. These branches are conventionally designed to hook onto the ears of the wearer, or merely to bear against them.

The face structure 43 possesses a bridge 46 for the nose in its central portion that is designed to go round the wearer's nose, and then symmetrically on either side of the bridge 46 and connected thereto, it possesses two horizontal strips 47, 48 which are generally in alignment with each other. More precisely, in the example shown, the face structure 43 is in the form of a continuous horizontal bar presenting a central fold forming the bridge 46 for the nose, together with the two strips 47, 48 horizontally in alignment with each other on either side of the central fold. In this example, the strips 47, 48 present a uniform section that is substantially square, with rounded corners.

In the embodiment described, the two strips 47, 48 and the bridge 46 form a single piece having the shape of a continuous horizontal bar with a vertical central fold forming the bridge 46 for the nose. Specifically, this structural bar is made as a single molding of transparent plastics material. By way of example, it is possible to use methyl polymethacrylate, polycarbonate, a polyester-polycarbonate copolymer, or any other transparent thermoplastic material.

Each of the strips 47, 48 of the frame contains a sloping mirror 49, 50 that can be seen through the strip and the clipped lens, and having an active display function that is explained in greater detail below.

The horizontal strips 47, 48 of the face structure 2 have two outer side ends with two endpieces 56, 57 engaged thereon, the endpieces being horizontally bent and carrying the two ear-engaging temples 44, 45 that are mounted to pivot thereto about vertical axes.

Each of the endpieces 56, 57 contains active display means such as a back-lit screen or a projector. These display means co-operate with the sloping mirrors 49, 50 to form an active display device that can be implemented in various ways, e.g. as described in U.S. Pat. Nos. 6,091,546 and 6,023,372. Since the display device is itself well known and does not itself form the subject matter of the present application, it is not described in greater detail; if necessary, reference can be made to the descriptions in the above-cited documents.

In its central zone, adjacent to the bridge 46, the structure 40 also possesses a nose pad 51 generally in the form of an upside-down V-shape suitable for fitting to the shape of the wearer's nose. This nose pad 51 is fitted to the horizontal strips 47, 48 by means of two fastener tabs 52, 53 arranged in a vertical plane parallel to the strips 47, 48 and fastened to the strips by hoops 54, 55 engaged on the strips on either side of the bridge 46. Specifically, the pad 51, the tabs 52, 53 and the hoops 54, 55 are made as a single piece of (crystalline or amorphous) polyamide, propionate, acetobutyrate, cellulose acetate, polycarbonate, or polyester-polycarbonate copolymer.

The two lenses 41, 42 are disposed on either side of the bridge 46 so each of the two strips 47, 48 is provided with means for fastening the lens that is associated therewith. The lenses 41, 42 are fastened in such a manner that the mirrors 49, 50 of the active display device can be seen through the bottom portions of the lenses 41, 42. The lenses thus perform their optical correction function when the wearer looks at the information supplied by the display device inside the horizontal strips 47, 48. This structural disposition is particularly advantageous with people presenting presbyopia, since it is then possible to mount multifocal type lenses on the frame 40, e.g. lenses that are bifocal or that present progressive power variation. The display eyeglasses can thus be provided, on demand, with multifocal lenses adapted to the ametropia and the lack of accommodation of any potential wearer so as to optimize the visual comfort of the wearer by presenting far vision that is unobstructed and corrected with the appropriate power by the top portion of the lenses, and near vision that is appropriately corrected with the right amount of added power to enable the images delivered by the display device to be seen clearly and sharply. In addition, near vision is partially unobstructed on either side of the mirrors 49, 50 because the strips 47, 48 are transparent.

In accordance with an essential characteristic of the invention, for convenience and speed, each lens 41, 42 is fastened by a clip-type fastening in an axial direction. The clip means used in the example shown are analogous to those proposed for the second embodiment described above with reference to FIGS. 6 to 8.

Thus, in order to receive the lenses 41, 42, the structure 40 is provided with two clamps arranged on either side of the bridge 46, each to receive the corresponding lens 41, 42. To fasten the lens associated therewith, each clamp is constituted by three studs in alignment that are suitable for holding the clamp like a vise. Thus, for fastening each lens 41, 42, there can be seen two side studs for bearing against the concave face of the lens, comprising a inner side stud 58, 60 and an outer side stud 59, 61, together with a central stud 62, 64 for bearing against the convex face of the lens.

The inner side stud 58, 60 is formed on the nose pad 51 and specifically it is integrally molded therewith. The outer side stud 59, 61 is formed on the corresponding endpiece 56, 57 and specifically is molded integrally therewith.

The side studs project inwards from the pad 51 and the endpieces 56, 57 parallel to the longitudinal direction of the strips 47, 48 and they are arranged to bear against the concave face of the corresponding lens 41, 42, in the vicinity of its periphery.

The central stud 62, 63 of each clamp is arranged to bear against the convex face of the corresponding lens 41, 42 at a distance from its periphery. In the example shown, each central stud 62, 63 is constituted by a rounded projection on a hoop 64, 65 engaged on the horizontal strips 47, 48. This hoop is made integrally with its stud-forming projection out of an elastomer, such as a silicone elastomer.

The side studs 58, 59, 60, 61 and the central studs 62, 63 are in horizontal alignment, parallel to the longitudinal direction of the strips 47, 48 and by virtue of their arrangement and the elasticity of the material constituting them and/or the material constituting the strips 47, 48, they provide three branches or studs of a resilient clamp for clipping to the corresponding lens. These three studs 58, 59 & 62 and 60, 61 & 63 all provide respective single-acting abutments and they are arranged to deliver axial resilient clamping on a lens that is distributed over at least three bearing zones in alignment. The term "alignment" is used to mean that the three studs and the corresponding bearing zones lie in a common plane, and specifically in this example a horizontal plane.

To produce the axial resilient clamping effect, the central and/or side studs possesses the ability to be withdrawn elastically in an axial direction. For example, in the example shown, provision could be made for the central studs 62, 63 to be elastically compressible.

On assembly, the portion of the strip 47, 48 concerned by the lens that is to be mounted, is deformed elastically so as to reduce its curvature, and/or the central or side studs 58, 59, 60, 61, 62, or 63 concerned are moved apart or compressed elastically in an axial direction so as to enable the lens to be received in the clamp. The lens is held therein by the axial resilient clamping that results from the lens being sandwiched between firstly the side studs 58, 59, 60, 61, and secondly the central studs 62, 63.

The means for clipping the lens 41, 42 further comprise means for providing orthoradial retention of each lens. In the example shown in FIGS. 9 to 11, these retention means are constituted by tongues 66, 67, 68, 69 formed in a horizontal plane on the nose pad 51 and the endpieces 56, 57. The tongues 66, 68 on the nose pad 51 thus extend between the inner studs 58, 60 and the fastener tabs 52, 53. The tongues 67, 69 of the endpieces 56, 57 extend between the outer studs 59, 61 and the bottoms of the notches 70, 71 in the endpieces 56, 57.

Each lens 41, 42 possesses its own orthoradial retention means that engage by co-operation of shapes with the above-described orthoradial retention means of the frame 40, i.e. specifically the tongues 66, 67, 68, 69. These orthoradial retention means of a lens are constituted in this example in the form of two analogous notches on opposite sides of the lens in a common horizontal plane.

On assembly, the tongues 66, 67, 68, 69 retract or compress elastically away from one another so as to enable the notches in the lens to engage on the corresponding tongues 66, 67, 68, 69 after going past a hard point. Since the notches in the lens present practically the same vertical width as the tongues, the lenses are held with little or practically zero slack.

As in the other embodiments, these retention means complete the quick fastening achieved by axial clamping to prevent unwanted potential sliding of the lens relative to the frame. In particular, these means prevent the lens from turning about its own axis away from a predetermined angular position.

The positioning of the lens is thus more precise, which is particularly advantageous when the lens has a complex optical function, such as lenses that are personalized and/or that present progressive power variation.

Such retention is also of particular importance with display eyeglasses insofar as the zone of the lens dedicated to viewing the image from the display device must be stable and positioned accurately so that the wearer can see the display sharply and clearly.

In addition, as in the second embodiment shown in FIGS. 6 to 8, provision has been made for the orthoradial retention means to constitute an axial slideway for the lens. This structural feature whereby the orthoradial retention means of the lens co-operate in sliding with the slideway of the frame has the function of making the frame more adaptable to lenses of different thicknesses and making it easier to mount the lenses, while ensuring that each lens is held firmly.

It is thus preferable, between each of the side studs 58, 59, 60, 61 and the fastening tabs 52, 53 of the pad 51 and the bottoms of the notches 70, 71, to provide adaptation space giving the means for clipping the lens axial clearance that is taken up by the resilience of the strip 47, 48 and/or of the central stud 62, 63.

Figure 14:
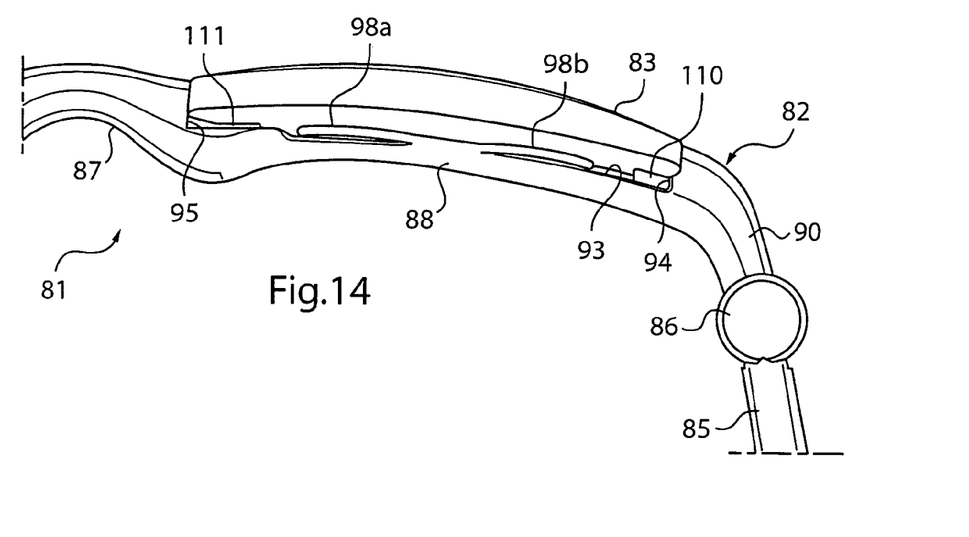
FIG. 14 is a fragmentary plan view showing the lens of FIG. 13 together with the frame.

FIGS. 12 to 14 show a fourth embodiment of the invention. A frame 81 comprises firstly a face structure 82 on which two lenses 83 are secured, and secondly two temples 85 for engaging the ears and hinged about vertical-axis hinges 86 to the side ends of the face structure 82. Only half of the frame is shown, with the other half being symmetrical thereto about a nasal midplane.

The face structure 82 has a central zone that possesses a bridge 87 for engaging the nose, the bridge presenting generally an upside-down V-shape, and the structure further possesses, symmetrically on either side of the bridge 87 and connected thereto, two horizontal strips 88 which are generally in alignment with each other.

In order to make it easier for the temples 85 to be hinged mechanically and in order to provide the frame with a certain amount of thickness for protecting the temples and the lenses, in particular when the temples 85 are folded against the frame 82, the strips 88 of the face structure 82 possess two horizontally-bent outer side ends 90 referred to as tenons, and the temples 85 are hinged thereto.

The structure 82 is in the form of a horizontal bar made of molded or injected plastics material and presenting a vertical central fold forming the bridge 87 for the nose, and on either side of this central fold, the two symmetrical strips 88 that are horizontally in alignment with each other and that are extended outwards by the two tenons 90.

With the two lenses 83 disposed on either side of the bridge 87, each of the two strips 88 is provided with means for fastening the associated lens 83.

In accordance with an essential characteristic of the invention, for reasons of convenience and speed, each lens 83 is fastened by a clip-type fastening. These means for clipping relate as before to the strips of the structure. Only the clipping means of the right-hand strip 88 are shown; however it will be understood that the left-hand strip (not shown) is provided with means that are symmetrical. Specifically, each of the two horizontal strips 88 of the structure 82 presents a front receiver notch 92. Along these receiver notches, each of the strips 88 is curved longitudinally to match the curvature of the lens. The means for clipping the lens are arranged at the two side ends of said receiver notch. The means for clipping the lens are arranged firstly on the bottom 93 and secondly at the two side ends 94, 95 of the receiver notch.

More precisely, two holding fingers 96, 97 are formed at the two side ends 94, 95 of the notch 92. These fingers project inwards from the side ends 94, 95, parallel to the longitudinal direction of the strip 88 in the corresponding zone, and they are arranged to bear against the convex face of the lens 83 in the vicinity of its periphery.

The bottom 93 of the receiver notch 92 is provided with two resiliently flexible blades or wings 98a, 98b that are slightly curved like the wings of a bird, extending in opposite directions to each other, horizontally, and sloping slightly from the middle of the strip 88 so that their free ends are at a distance from the strip 88 in order to bear resiliently against the concave face of the lens 83 as a distance from its peripheral edge. The blades 98a, 98b present a horizontal thickness that is substantially smaller than their vertical width, so as to be sufficiently flexible and so as to offer a bearing area against the lens that is sufficient to hold the lens stably without damaging the surface state thereof. In a variant, the resilient blades 98a, 98b could be replaced by an elastically flexible blade in the form of a bridge for a loop with the top thereof being suitable for bearing against the lens.

The two side fingers 96, 97 and the resilient blades 98a, 98b of the receiver notch 92 are in horizontal alignment, and by their arrangement and the resilience of the blades 98a, 98b, they constitute four branches or studs of a resilient clamp. Each of these four studs 96, 97, 98a, 98b forms a single-acting abutment, and together they are arranged to apply to the lens axial resilient clamping that is distributed over four bearing zones in alignment. The term "alignment" is used to mean that the four studs and the corresponding bearing zones lie in a common median plane, which is in the example described is horizontal.

On assembly, the blades 98a, 98b of the receiver notch 92 are deformed elastically in bending towards the strip 88 by the lens 83 being received in the notch 92, and the lens is held therein tightly under the effect of the elastic shape memory of the blades 98a, 98b. The elastic shape memory of the blades 98a, 98b then applies axial resilient clamping of the lens as a result of it being sandwiched between firstly the side fingers 96, 97 and secondly the blades 98a, 98b projecting from the bottom 93 of the receiver notch.

The means for clipping the lenses are constituted, for fastening a lens, solely by the resilient clamp comprising four studs in alignment of the type described above. For the same reasons as those mentioned above with respect to the first and second embodiments, it is preferable to provide for the side studs of the clamp, i.e. in this case the fingers 96, 97 to be spaced apart angularly from each other by at least 90° and at most 160° relative to the axis of the geometrical center of the peripheral edge of the lens. Specifically, this angular spacing is about 145°, and a good compromise is obtained between robust fastening and leaving an unobstructed top field of vision when the angle lies in the range 130° to 160°.

The means for clipping the lens further comprise means for retaining each lens orthoradially. In the example shown in FIGS. 12 to 14, these retention means, as in the second embodiment of FIGS. 6 to 8, are constituted by axial tongues 110, 111 formed in a horizontal plane at the side ends 94, 95 of the receiver notch 92 between the bottom 93 of the notch and the fingers 96, 97. The lens 83 itself possesses its own orthoradial retention means implemented in the form of two analogous notches on opposite sides and in a common horizontal plane. On assembly, these notches engage the tongues 110, 111 of the strip 88 and present practically the same vertical width as the tongues so as to obtain retention with little or practically no slack. These retention means complement the quick fastening by axial clamping to prevent any possible unwanted sliding of the lens relative to the frame. These means serve in particular to prevent the lens from turning about its own axis from a predetermined angular position. The positioning of the lens is thus more accurate, which is particularly advantageous when the lens provides a complex optical function, such as lenses that are personalized and/or that present progressive power variation.

In addition, the orthoradial retention means constitute an axial slideway for the lens. This structural feature, whereby the orthoradial retention means of the lens co-operates slidably with the slideway of the frame, has the function of making the frame more adaptable to lenses of different thicknesses and of making it easier to mount the lenses, while still ensuring that they are prevented from moving. Thus, an adaptation space of not less than 4 mm is preferably provided between each of the fingers 96, 97 and the bottom 93 of the notch, thus providing the means for clipping the lens with axial clearance that is taken up by the resilience of the blades 98a, 98b of the strip 88.

The face structure 82 with its two strips, its bridge for the nose, its bent ends, and its means for clipping to the lenses, is made as a single piece and is in the form of a horizontal bar presenting a vertical central fold forming the bridge 87 for the nose. In the example described, this structural bar 82 is made as a one-piece plastics molding, and in particular the blades 98a, 98b are integrally molded with the remainder of each strip 88. Care should be taken to select a material that provides sufficient overall stiffness for the frame to prevent it deforming in unwanted manner while being worn, and in particular to prevent the structural bar 82 curving in normal use, while also having a certain capacity for elastic deformation so as to enable the lenses to be clipped in the notches. For example, it is possible to use (crystalline or amorphous) polyamide, propionate, acetobutyrate, cellulose acetate, polycarbonate, or polyester-polycarbonate copolymer.

What is claimed is:

1. An eyeglasses frame with clipped lenses, the frame comprising a face structure provided with means for clipping to at least one lens, wherein the means for clipping to at least one lens are arranged to operate by elastically clamping the lens, said clamping being exerted in a direction that is generally axial relative to the lens and exclusively in localized bearing zones spaced apart from each other, at least two of which are situated close to the edge of the lens and are angularly spaced apart from each other by at least 90° relative to the geometrical center of the edge of the lens.

2. A frame according to claim 1, in which the means for clipping to at least one lens are arranged to operate by bidirectional resilient clamping of the lens both in a transverse direction and in an axial direction relative to the lens.

3. A frame according to claim 2, in which the means for clipping to at least one lens possess at least one oblique contact surface for acting like a ramp surface that provides the bidirectional nature of the clamping of the lens.

4. A frame according to claim 3, in which the means for clipping to at least one lens comprise at least two resilient clamps arranged to apply two resilient axial clamping forces on the lens that are located in two clamping zones situated in the vicinity of the edge of the lens, and in which the at least one of the resilient clamps presents a V-shape.

5. A frame according to claim 4, in which the face structure possesses a central bridge for the nose and, on either side of said nose bridge and interconnected thereby, two horizontal strips which are generally in alignment with each other, and at least one of which is provided with said means for clipping to at least one lens, in which the strip presents a front notch for receiving the corresponding lens, at least a portion of the means for clipping to at least one lens being arranged at each of the two ends of said redeiver notch, and in which the ends of the receiver notch are arranged in undercut manner so that by their shape and material they constitute said V-shaped clamps.

6. A frame according to claim 1, in which the means for clipping to at least one lens comprise means for retaining the lens orthoradially.

7. A frame according to claim 6, in which the orthoradial retention means constitute an axial slideway for the lens.

8. A frame according to claim 1, in which the means for clipping to at least one lens comprise at least one resilient clamp having at least three studs each forming a single acting abutment and arranged in a common horizontal plane to apply axial resilient clamping to the lens that is distributed over at least three bearing zones in alignment, there being two studs arranged to bear against the lens in the vicinity of its edge, on one face thereof, and a central stud situated between the two side studs and arranged to bear against the other face of the lens.

9. A frame according to claim 8, in which the two side studs are angularly spaced apart from each other by at least 90° relative to the geometrical center of the edge of the clipped lens.

10. A frame according to claim 9, in which the central stud is formed by an elastically flexible blade.

11. A frame according to claim 10, in which the elastically flexible blade is curved.

12. A frame according to claim 11, having two central studs formed by two curved elastically flexible blades arranged in a configuration like the wings of a bird.

13. A frame according to claim 8, in which at least one of the bearing or clamping zones extends over an orthoradial width of at least 4 mm.

14. A frame according to claim 1, in which the means for clipping to at least one lens comprise at least two resilient clamps arranged to apply two resilient axial clamping forces on the lens that are located in two spaced apart clamping zones situated in the vicinity of the edge of the lens.

15. A frame according to claim 14, in which the means for clipping the lenses comprise, for fastening a lens, exclusively two resilient clamps having localized clamping of the above-specified type, that are situated in a common horizontal plane and that are axially spaced apart from each other by at least 90° relative to the geometrical center of the edge of the lens.

16. A frame according to claim 1, in which the face structure possesses a central bridge for the nose and, on either side of said nose bridge and interconnected thereby, two horizontal strips which are generally in alignment with each other, and at least one of which is provided with said means for clipping to at least one lens.

17. A frame according to claim 16, in which the strip presents a front notch for receiving the corresponding lens, at least a portion of the means for clipping to at least one lens being arranged at each of the two ends of said receiver notch.

18. A frame according to claim 17, in which the means for clipping to at least one lens comprise means for retaining the lens orthoradially, in which the orthoradial retention means constitute an axial slideway for the lens, and in which the side edge of the receiver notch of the strip is provided with a tongue forming said slideway.

19. A frame according to claim 17, in which the means for clipping to at least one lens comprise at least one resilient clamp having at least three studs each forming a single acting abutment and arranged in a common horizontal plane to apply axial resilient clamping to the lens that is distributed over at least three bearing zones in alignment, there being two studs arranged to bear against the lens in the vicinity of its edge, on one face thereof, and a central stud situated between the two side studs and arranged to bear against the other face of the lens, and in which the side studs of the clamp are constituted by a finger formed at the side edge of the receiver notch of the strip.

20. A frame according to claim 16, in which the face structure with its two strips, its nose bridge, and its means for clipping to at least one lens is made as a single piece in the form of a horizontal bar presenting a vertical central fold forming the nose bridge.

21. A frame according to claim 20, in which the strips of the face structure present two outer side ends that are horizontally bent and that have two ear-engaging temples hinged thereto, and in which the bent ends are made integrally with the remainder of the face structure.

22. A frame according to claim 16, in which the strips of the face structure present two outer side ends that are horizontally bent and that have two ear-engaging temples hinged thereto.

23. A frame according to claim 16, in which at least one of the strips contains an active display device.

24. A pair of eyeglasses comprising two lenses mounted in a frame according to claim 1, each lens being held by the frame only at two spaced-apart locations.

25. A pair of eyeglasses according to claim 24, in which the means for clipping to at least one lens comprise means for retaining the lens orthoradially, and in which the eyeglasses have at least one lens presenting orthoradial retention means engaged by co-operation of shapes with the orthoradial retention means of the means of the frame for clipping to at least one lens.

26. A pair of eyeglasses according to claim 25, in which the orthoradial retention means constitute an axial slideway for the lens, and in which the orthoradial retention means of the lens co-operate slidably with slideway-forming retention means of the frame.

27. A pair of eyeglasses according to claim 25, in which the means for clipping to at least one lens are arranged to operate by bidirectional resilient clamping of the lens both in a transverse direction and in an axial direction relative to the lens, in which the means for clipping to at least one lens possess at least one oblique contact surface for acting like a ramp surface that provides the bidirectional nature of the clamping of the lens, and in which the orthoradial retention means of the lens possess a chamfered surface arranged to co-operate as an oblique ramp with the oblique contact surface of the means of the frame for clipping to at least one lens.

28. A pair of eyeglasses according to claim 27, in which the orthoradial retention means of the lens are made in the form of two analogous notches on opposite sides on a common horizontal plane, and in which at least one of the notches possesses a chamfered bottom.

29. A pair of eyeglasses according to claim 25, in which the orthoradial retention means of the lens are made in the form of two analogous notches on opposite sides on a common horizontal plane.

30. A pair of eyeglasses according to claim 24, in which the frame is provided with an active display device that is visible through the clipped-on lens.

31. A pair of eyeglasses according to claim 30, in which the face structure possesses a central bridge for the nose and, on either side of said nose bridge and interconnected thereby, two horizontal strips which are generally in alignment with each other, and at least one of which is provided with said means for clipping to at least one lens, and in which at least a portion of the display device is received in at least one of the strips of the frame.

* * * * *